No. 776,739. PATENTED DEC. 6, 1904.
R. R. HALL.
EYEGLASSES.
APPLICATION FILED JUNE 30, 1904.
NO MODEL.

Witnesses:
F. C. Fliedner
J. H. Nurse

Inventor:
Robert R. Hall
By Geo. H. Strong
Atty

No. 776,739. Patented December 6, 1904.

UNITED STATES PATENT OFFICE.

ROBERT R. HALL, OF SAN FRANCISCO, CALIFORNIA.

EYEGLASSES.

SPECIFICATION forming part of Letters Patent No. 776,739, dated December 6, 1904.

Application filed June 30, 1904. Serial No. 214,776. (No model.)

*To all whom it may concern:*

Be it known that I, ROBERT R. HALL, a citizen of the United States, residing in the city and county of San Francisco and State of California, have invented new and useful Improvements in Eyeglasses, of which the following is a specification.

My invention relates to improvements in eyeglasses, and pertains particularly to the spring connecting the lenses. Its object is to provide a small, strong, neat, and simple spring connection whereby the lenses may be held securely in position on the nose and close to the eyes and which will prevent the lenses tilting or drooping, as so often occurs with the large bow-springs.

It consists of the parts and the construction and combination of parts, as hereinafter more fully described and claimed, having reference to the accompanying drawings, in which—

Figure 1:
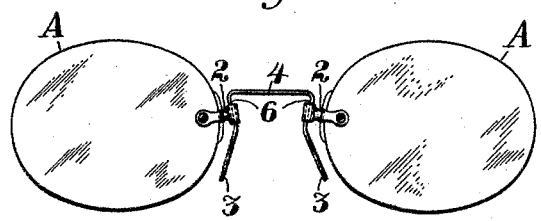
Figure 2:
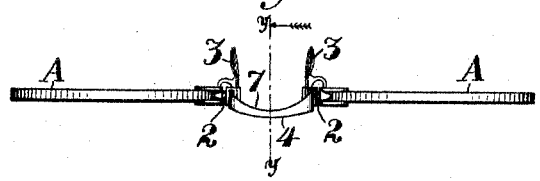
Figure 3:
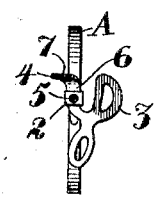

Figure 1 is a front view of the eyeglasses fitted with my invention. Fig. 2 is an edge view of the same. Fig. 3 is a view on line *y y* of Fig. 2.

The lenses A are secured to the usual posts 2, which support the nose-guards 3 and also the ends of the spring 4. The latter forms the subject-matter of the present invention. The spring and guards are fastened to the posts by screws, as shown at 5. The spring has a straight horizontal portion arranged in a plane at right angles to the plane of the lenses and two short straight side or end portions 6 bent rather sharply and approximately at right angles, but offset relative to the central horizontal portion. As shown in Figs. 2 and 3, the end portions 6 lie within the plane substantially of the lenses, while the horizontal central portion is projected forward beyond the plane of the lenses. The edges of the horizontal portion are concavo-convexed, at least the inner edge of the spring is essentially concaved, as indicated at 7, to afford the necessary "Grecian" to accommodate the nose and to let the lenses come in close to the eyes, as they should. This concavity is shown as extending beyond the plane of the lenses.

When the eyeglasses are in position on the wearer, they are supported on the sides of the nose by the guards and on top of the nose by the spring. They are held on rigidly and cannot come off.

By using a small straight spring, as here shown, with its resilient horizontal portion at right angles to the plane of the lenses the latter are made to pivot in relation to each other in the same plane which is the correct way for them to turn when being put on or off the nose. Furthermore, the axes of the lenses are kept in alinement when once the eyeglasses are fitted and do not tend to droop, as is the case with the larger clumsy bows. The present spring being so small and with straight lines will not get out of shape.

With a pair of glasses of this type in position on the wearer very little metal is visible, simply the posts, the edges of the guards, and a straight narrow line indicating the spring across the nose.

Having thus described my invention, what I claim, and desire to secure by Letters Patent, is—

1. In eyeglasses the combination with the lenses, of supporting-posts, guards, and a spring having a horizontal, straight central resilient portion arranged in a plane at right angles to the plane of the lenses and in advance of the plane of the lenses, said spring having straight, rigid and substantially vertical end portions connected with the posts, said horizontal portion having a concaved inner edge.

2. In eyeglasses the combination with lenses posts and guards, of a spring having a central horizontal portion bendable in a plane parallel with the plane of the lenses but arranged in advance of the plane of the lenses and having short lateral substantially vertical portions engaging the posts and made substantially rigid, said central horizontal portion concaved on its inner edge to accommodate the nose and adapted to bear directly upon or against the nose when the glasses are in position on the wearer.

In testimony whereof I have hereunto set my hand in presence of two subscribing witnesses.

ROBERT R. HALL.

Witnesses:
ALFRED L. HOLLING,
CLARENCE L. LUCKEY.